(12) United States Patent
Wohlert et al.

(10) Patent No.: US 10,009,413 B2
(45) Date of Patent: Jun. 26, 2018

(54) COLLABORATIVE MEDIA PLAYBACK

(71) Applicant: AT&T Intellectual Property I, L.P., Atlanta, GA (US)

(72) Inventors: Randolph Wohlert, Austin, TX (US); Milap V. Majmundar, Austin, TX (US); James H. Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 125 days.

(21) Appl. No.: 14/315,839

(22) Filed: Jun. 26, 2014

(65) Prior Publication Data

US 2015/0381706 A1    Dec. 31, 2015

(51) Int. Cl.
| | |
|---|---|
| G06F 15/16 | (2006.01) |
| H04J 3/00 | (2006.01) |
| H04J 3/06 | (2006.01) |
| H04W 36/00 | (2009.01) |
| H04W 56/00 | (2009.01) |
| H04L 29/08 | (2006.01) |
| H04L 29/06 | (2006.01) |
| H04W 52/02 | (2009.01) |
| H04L 12/18 | (2006.01) |

(52) U.S. Cl.
CPC ............. *H04L 67/10* (2013.01); *H04L 65/60* (2013.01); *H04L 12/1881* (2013.01); *H04W 52/0216* (2013.01); *H04W 56/001* (2013.01); *H04W 56/0015* (2013.01)

(58) Field of Classification Search
CPC ............. H04N 21/4307; H04N 9/8205; G11B 2220/2541
See application file for complete search history.

(56) References Cited

U.S. PATENT DOCUMENTS

| | | | |
|---|---|---|---|
| 6,965,785 B2 | 11/2005 | Mager et al. | |
| 7,142,807 B2 | 11/2006 | Lee | |
| 7,185,090 B2 | 2/2007 | Kowalski et al. | |
| 7,516,078 B2 | 4/2009 | Dhawan et al. | |
| 7,539,551 B2 | 5/2009 | Komura et al. | |
| 7,657,224 B2 | 2/2010 | Goldberg et al. | |
| 7,657,829 B2 | 2/2010 | Panabaker et al. | |
| 7,697,925 B1 | 4/2010 | Wilson et al. | |
| 7,742,740 B2 | 6/2010 | Goldberg et al. | |
| 7,747,338 B2 | 6/2010 | Korhonen | |
| 7,894,511 B2 | 2/2011 | Zurek et al. | |
| 8,015,306 B2 | 9/2011 | Bowman | |
| 8,380,127 B2 | 2/2013 | Halla et al. | |
| 9,172,982 B1 * | 10/2015 | Kizhepat | H04N 21/2365 |
| 2006/0179160 A1 | 8/2006 | Uehara et al. | |

(Continued)

*Primary Examiner* — Nicholas R Taylor
*Assistant Examiner* — Ho T Shiu
(74) *Attorney, Agent, or Firm* — Hartman & Citrin LLC

(57) ABSTRACT

Concepts and technologies disclosed herein are directed to collaborative media playback. According to one aspect disclosed herein, a media playback node can receive information for use in determining a start time for playback of media content so that playback of the media content is in sync with playback of the media content by a further playback node. The media playback node also can determine, based at least in part upon the information, the start time for playback of the media content. The media playback node also can initiate playback of the media content at the start time.

17 Claims, 10 Drawing Sheets

(56) References Cited

U.S. PATENT DOCUMENTS

| | | | |
|---|---|---|---|
| 2007/0087686 A1 | 4/2007 | Holm et al. | |
| 2007/0223876 A1* | 9/2007 | Hashimoto | G11B 19/025 386/241 |
| 2008/0040759 A1* | 2/2008 | She | H04L 29/06027 725/81 |
| 2008/0131085 A1* | 6/2008 | Ikeda | G11B 19/12 386/336 |
| 2008/0152165 A1 | 6/2008 | Zacchi | |
| 2008/0198785 A1* | 8/2008 | Huang | H04W 72/005 370/312 |
| 2009/0279869 A1* | 11/2009 | Ogawa | G11B 27/034 386/248 |
| 2011/0091187 A1* | 4/2011 | Duffin | G11B 27/322 386/343 |
| 2011/0135283 A1* | 6/2011 | Poniatowki | H04N 5/76 386/297 |
| 2011/0143773 A1* | 6/2011 | Kangas | G01S 5/02 455/456.1 |
| 2012/0257601 A1* | 10/2012 | Kim | H04L 5/001 370/336 |
| 2013/0031217 A1* | 1/2013 | Rajapakse | H04L 65/4076 709/219 |
| 2013/0260735 A1* | 10/2013 | Dinan | H04W 72/0406 455/418 |
| 2014/0032778 A1* | 1/2014 | Sim | H04L 65/60 709/232 |
| 2015/0023267 A1* | 1/2015 | Lim | H04L 1/1854 370/329 |
| 2015/0103819 A1* | 4/2015 | Fujishiro | H04W 56/0015 370/350 |
| 2015/0220498 A1* | 8/2015 | Munoz | G06F 17/2235 715/205 |
| 2016/0149660 A1* | 5/2016 | Seo | H04W 56/0015 370/336 |

* cited by examiner

COLLABORATIVE MEDIA PLAYBACK

BACKGROUND

By combining the acoustic capabilities of multiple speakers, a dramatically improved listening experience can be provided for users. A common example of this is provided by sound bars. Sound bars can create a three-dimensional surround sound experience from an array of small speakers. The concept of a multichannel sound bar has been around since the late 1990's when ALTEC LANSING introduced the Voice of the Digital Theatre ("ADA106"). Various improvements to sound bar technologies have been introduced over the years to reduce cross talk and other acoustic phenomena. Today, sound bars can create sound that is as immersive as traditional surround sound components that utilize multiple speakers located in various places within an area.

SUMMARY

Concepts and technologies disclosed herein are directed to collaborative media playback. According to one aspect disclosed herein, multiple networked components (e.g., speakers) provided by media playback nodes (e.g., mobile devices) playback media, such as audio, in a synchronized manner so as to create an adhoc, multi-speaker sound system. In addition to or as an alternative to sound, light emitting diodes ("LEDs"), display screens, and/or other light sources can be used to provide visual effects that can be synchronized among multiple devices.

According to one embodiment disclosed herein, a media playback node can receive information for use in determining a start time for playback of media content so that playback of the media content is in sync with playback of the media content by a further media playback node. The media playback node also can determine, based at least in part upon the information, the start time for playback of the media content, and can initiate playback of the media content at the start time.

In some embodiments, the media playback node receives the information via a physical layer application programming interface that exposes the information to a media playback application that is executable by the media playback node. In these embodiments, the information can include a synchronization signal, timing advance information and a subframe number. The media playback node, in these embodiments, also can receive a common time reference from a time reference server. The media playback node can determine the start time for playback of the media playback based upon the synchronization signal, the timing advance information, the subframe number, and the common time reference.

In some embodiments, the media playback node receives the information from a time reference server. The information can include a reference time. The media playback node also can estimate, based upon the reference time, a roundtrip delay to the time reference server. The start time for playback of the media content can be determined using the estimated roundtrip delay.

In some embodiments, the media playback node receives the information from an application server. In these embodiments, the information can include the start time as determined by the application server.

In some embodiments, the media content includes audio content. In some other embodiments, the media content includes video content. In some other embodiments, the media content includes lighting effects content. In some other embodiments, the media content includes a combination of video content, audio content, and/or lighting effects content.

In some embodiments, the media playback node also can stream the media content from a content server. In these embodiments, the media playback node also can establish a media playback network, such as a BLUETOOTH network or ad-hoc WI-FI network. The media playback node can provide the media content to the further media playback node via the media playback network. The media content can alternatively be stored locally in a memory component of the media playback node.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Concepts and technologies disclosed herein are directed to collaborative media playback. According to one embodiment disclosed herein, multiple networked components (e.g., speakers) provided by media playback nodes (e.g., mobile devices) playback media, such as audio, in a synchronized manner so as to create an adhoc, multi-speaker sound system. In addition to or as an alternative to sound, light emitting diodes ("LEDs"), display screens, and/or other light sources can provide visual effects that can be synchronized among multiple devices.

While the subject matter described herein may be presented in the general context of program modules that execute in conjunction with the execution of an operating system and application programs on a computer system, computing device, mobile device, and/or other computing resource, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
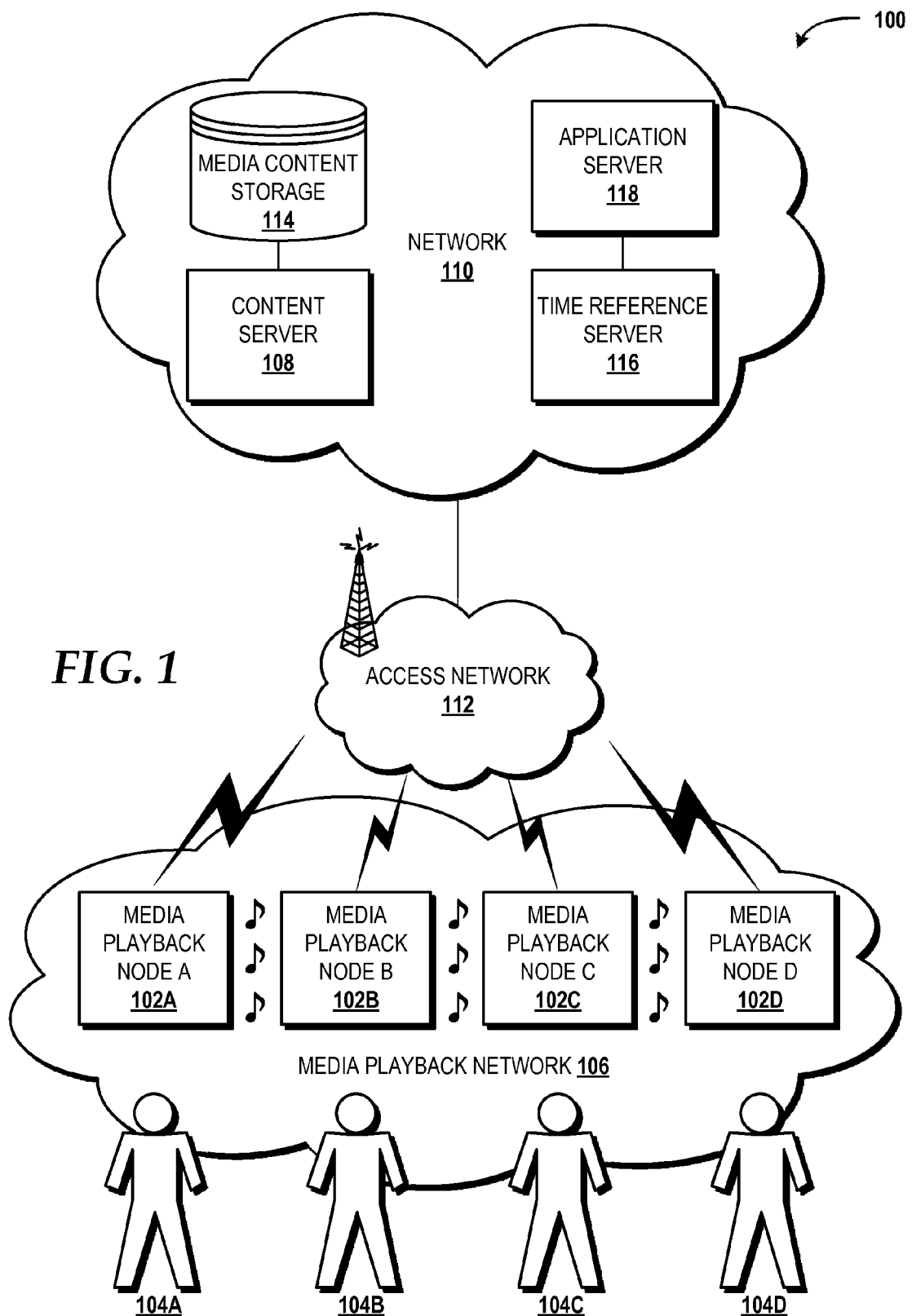
FIG. 1 is a diagram illustrating an operating environment for providing collaborative media playback, according to an illustrative embodiment.

Referring now to FIG. 1, a diagram illustrating an operating environment 100 for providing collaborative media playback will be described, according to an illustrative embodiment. The illustrative operating environment 100 includes a plurality of media playback nodes 102A-102D (referred to herein in the singular as media playback node 102, or collectively as media playback nodes 102), each of which is associated with one of a plurality of users 104A-104D (referred to herein in the singular as user 104, or collectively as users 104). The users 104 may desire to engage in a collaborative media playback session during which at least a portion of media is played via a media playback component (best shown in FIG. 2) of each of the media playback nodes 102. The media can be any type of media content such as, but not limited to, audio (e.g., music), video, other visual media (e.g., lighting effects), and combinations thereof. The playback component can be or can include a speaker, a display screen, a light source (e.g., an LED), or a combination thereof. The media playback component and other components of an illustrative example of the media playback nodes 102 will be described below with reference to FIG. 2.

Each of the media playback nodes 102 can, in a synchronous manner, play media for the users 104. For example, the media playback nodes 102 can play music or video, or can provide a synchronous visual display. The playback of media content by each of the media playback nodes 102 can be adapted to provide an optimized audio/visual user experience for the users 104.

In some embodiments, the playback of media content by each of the media playback nodes 102 can be adapted to provide spatial relationship effects for stereo and surround sound. For example, an implementation of two of the media playback nodes 102 can be used to provide right and left stereo channels by positioning one of the media playback nodes 102 as a right channel speaker and another of the media playback nodes 102 as a left channel speaker to provide a stereo sound experience for one or more of the users 104. Another example implementation can use all of the illustrated media playback nodes 102—two for the front-left and front-right and two for the rear-left and rear-right—to provide a surround sound experience for one or more of the users 104. Additional channels, such as center, surround rear left, surround rear right, and low frequency channels, can be added by one or more further media playback nodes (not shown) to provide a more immersive surround sound experience. It should be understood that any number of media playback nodes 102 can be used to provide any number of audio channels. It also should be understood that each channel can be configured to provide a full-range or partial range of frequencies, which may, in some instances, be utilized to isolate particular instruments played during a song. As such, the examples provided above should not be construed as being limiting in any way.

In some embodiments, sound shaping sound fields can be created by the media playback nodes 102 and can be used to provide noise reduction, including, for example, a "cone of silence" around persons speaking to one another. To provide a "cone of silence," two or more of the media playback nodes 102 can be positioned such that the media playback nodes 102 face each other and emit sound cancelling signals synchronized to the speech of two or more of the users 104. In another example, some of the media playback nodes 102 can be positioned to face inward towards the users 104 and can generate sound intended for the users 104 only, while other nodes of the media playback nodes 102 can be positioned to face outward toward other individuals (not shown) and can generate sound cancelling signals so that the other individuals are not disturbed or at least are not as disturbed as the other individuals would be if sound cancelling was not used.

The media playback nodes 102 can be used in applications where the users 104 are moving. For example, the users 104 may be a group of runners preparing for a marathon and each of the users 104 is wearing one of the media playback nodes 102 on an armband. Typically, the users 104 may each play motivating songs through headphones while they are running. With the concepts and technologies disclosed herein, the users 104 can experience a collective, cooperative, and rich sound experience, which can include one or more of the effects explained above. For example, each runner could effectively be a "player" in a symphony, with their respective media playback node 102 playing the part of a particular instrument. Or, by way of another example, waves of sound could be created by the media playback nodes 102 such that the sound is perceived by the runners to flow from the back of the group to the front of the group, urging the runners to continue running. At a marathon race or other event, crowd participants can become engaged as well, contributing to the experience. In addition, visual displays (e.g., rippling light effects, and the like) also can be provided to urge the runners/participants on and contribute to the excitement and adrenaline of the event. Moreover, some implementations may incorporate biometric feedback to select content and effects to match the pace of the runners and keep the group together.

Media content can be made available to the media playback nodes 102 via several content provisioning methods. In some embodiments, the media playback nodes 102 can communicate with each other via a media playback network 106. In some embodiments, one of the media playback nodes 102 (e.g., media playback node A 102A) can stream media content from a content server 108 operating within a network 110 via an access network 112. In these embodiments, the media playback node A 102A can create the media playback network 106 over which the other media playback nodes (e.g., the media playback nodes 102B-102D) can stream the media content from the media playback node A 102A. The media playback network 106 can be created and can operate in accordance with BLUETOOTH protocol, ad-hoc WI-FI protocol, a proprietary protocol, or any other protocol suitable for streaming media content from one device to one or more other devices. In some other embodiments, a media playback component (best shown in FIG. 2) of each of the media playback nodes 102 can present at least a portion of the media content to the users 104. In some other embodiments, each of the media playback nodes 102 can stream media content from the content server 108 and the media playback component of each of the media playback nodes 102 can present at least a portion of the media content to the users 104.

In some other embodiments, one of the media playback nodes 102 (e.g., media playback node A 102A) can locally store media content that can be streamed by the other media playback nodes (e.g., the media playback nodes 102B-102D) via the media playback network 106 established by the media playback node 102A. The locally stored media content may have been downloaded by the media playback node A 102A from the content server 108 and stored in a storage component (best shown in FIG. 2) of the media playback node A 102A. Alternatively, the locally stored media content may have been downloaded from another source (e.g., a website) or acquired from another source such as physical media (e.g., a compact disc).

The content server 108 can communicate with media content storage 114 to obtain media content and provide the media content to one or more of the media playback nodes 102 via the access network 112. In some embodiments, the content server 108 is provided by or as part of a media streaming service such as, for example, SPOTIFY streaming music service, available from SPOTIFY LTD., PANDORA streaming music service, available from PANDORA MEDIA, INC., ITUNES RADIO streaming music service, available from APPLE INC., or NETFLIX streaming video service, available from NETFLIX, INC. In some other embodiments, the content server 108 is provided by or as part of a media download service. A service that utilizes the content server 108 may be provided for free, for a one-time fee, or on a subscription basis.

The media content storage 114 can include any type and any number of computer data storage devices, including, but not limited to, semiconductor storage devices, magnetic storage devices, optical storage devices, combinations thereof, and the like. The media content storage 114 can be co-located with the content server 108 or available remotely from the content server 108 via the network 110.

The network 110 can be or can include, for example, one or more wireless local area networks ("WLANs"), one or more wireless wide area networks ("WWANS"), one or more wireless metropolitan area networks ("WMANs"), one or more campus area networks ("CANs"), and/or one or more packet data networks such as the Internet or a portion thereof. The communications network may use any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The communications network embodied as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

The access network 112 can include one or more radio access networks that facilitate wireless radio access to the network 110. The access network 112, in some embodiments, is a GSM radio access network ("GRAN"), a GERAN, a UMTS radio access network ("UTRAN"), a LTE radio access network ("E-UTRAN"), or an IP connectivity access network (e.g., WLAN access point network). Other access network types are contemplated, including access network technologies in development or to be developed.

The media content to be played by the media playback nodes 102 can be synchronized. Several timing synchronization methods can be used. In some embodiments, playback of the media content by the media playback nodes 102 is synchronized using timing synchronization signals provided by a base station (best shown in FIG. 3) operating within the access network 112 and a common time reference provided by a time reference server 116. An example of this timing synchronization method is illustrated and described with reference to FIGS. 4A and 4B. In some other embodiments, the common time reference provided by the time reference server 116 is used to estimate network delay and to determine a media playback start time used to synchronize playback of the media content among the media playback nodes 102. An example of this timing synchronization method is illustrated and described with reference to FIG. 5. In some other embodiments, an application server 118 can coordinate media playback across the media playback nodes 102 using the common time reference received from the time reference server 116. An example of this timing synchronization method is illustrated and described with reference to FIG. 6. Other timing synchronization methods also will be described herein.

The concepts and technologies disclosed herein can be utilized to provide various user experiences. Several illustrative user experiences will now be described. It should be understood that the user experiences described below are not exhaustive, and therefore should not be construed as being limiting in any way.

In a first illustrative user experience, a small group of friends (represented, for example, as the users 104 in FIG. 1) gather spontaneously at the home of one of the users 104 (e.g., the user A 104A). The user A 104A does not have a high end stereo sound system, but he/she and his/her friends want to listen to a new song release by their favorite artist. Using the concepts and technologies described herein, the user A 104A initiates a stream of the song from the content server 108 via the media playback node A 102A. The media playback node A 102A then establishes the media playback network 106 and provides a stream of the song to the other media playback nodes 102B-102D via the media playback network 106. The media playback nodes 102 can utilize a timing synchronization method, such as introduced above and described in greater detail herein below, to synchronize with each other to collectively provide a sonically enriched immersive sound field for the users 104. The first illustrative user experience could be provided anywhere, anytime, and for any number of users. The first illustrative user experience could, for example, involve a few friends gathered in a room, or hundreds or thousands of people gathered at stadium. The first illustrative user experience could be indoors or outdoors. The first illustrative user experience could be friends gathered around a campfire, at the beach, the basketball court, or town square, for example. The first illustrative user experience could enable spontaneous "flash" dance parties without needing cumbersome sound equipment.

In a second illustrative user experience, the concepts and technologies described herein are used to provide a mobile sound field to a group of people (represented, for example, as the users 104 in FIG. 1). For example, a group of friends running together during training or in a marathon could share the same motivational music with each other as they run. The sound field created would move with the runners as they run. Similar applications of the concepts and technologies disclosed herein could be used by bicyclers, kayakers, joggers, and other groups of moving people. Furthermore, the concepts and technologies described herein could dynamically adapt the music by selecting appropriate songs with a beat-per-minute value that is aligned with the heart rate, activity, and/or speed of the participants, ramping up or slowing down accordingly. In another variation of the second illustrative user experience, the music could be synchronized to a location. For example, all devices associated with runners in front of Pirate Jim's Restaurant could play a pirate-themed song, while those in front of B.B's Blues Bar could play BB King's song Sweet 16.

In a third illustrative user experience, the concepts and technologies described herein are used to provide a visual effect to a group of people (represented, for example, as the users 104 in FIG. 1). For example, during a football game, the home team scores a touchdown, and as a result, a wave of light bursts out from the crowd, ripples through the stadium and reflects off the edges. The light wave is enabled by the users 102 holding up their respective media playback node 102. A computing system (e.g., the application server 118) knows the location of the media playback nodes 102 and the triggering event—the touchdown. The computing system selects from a variety of effects to produce an enhanced visual wave by sequentially lighting up the media playback nodes 102 to create a rippling, reflecting light wave effect. The light wave can be multicolored, and can change in intensity, width, and/or color as the light wave ripples through the crowd. A wide variety of visual effects can be provided for a wide variety of sporting events. In addition, the lighting effects can be accompanied by audio effects. For example, a collective "whoosh" sound or a choreographed "team yell" could be provided as the light wave ripples around the stadium.

In a fourth illustrative user experience, the concepts and technologies described herein are used to provide more effective safety messages under various scenarios. For example, the users 104 are at the beach and need to be provided with a public warning message (e.g. a tsunami is approaching, head inland, and take shelter immediately). The message could be synchronously provided across multiple devices, including the media playback nodes 102, to provide a louder and clearer message audible not only to the users 104, but to people in the vicinity of media playback nodes 102 as well. The fourth illustrative user experience could be desirable in a wide variety of public venues, including, for example, malls, schools, city centers, and the like. The fourth illustrative user experience could be used for any type of safety scenario. The concepts and technologies disclosed herein could be used to provide additional visual safety functionality. For example, a collective synchronization of blinking lights could guide users 104 to the exits in a smoke filled building, even if the power in the building is out.

In a fifth illustrative user experience, the concepts and technologies described herein are used to provide coordinated audio and/or video with mobile and stationary playback nodes. For example, a sales pitch could utilize coordinated audio and video effects that ripple across the audience from the media playback nodes 102 of the members of your team.

In addition to cell phones, laptops, tablets, and other mobile devices, the concepts and technologies disclosed herein can coordinate acoustic and visual effects generated by "fixed" devices, such as IP televisions. For example, a user 104 standing in front of a television in a store window could experience a dynamic sound and/or light show driven by his/her personal device, such as the media playback node 102, and the television. The sound and/or light show can include advertising or any other media. The user 104 can have a dynamic multimedia experience in their home as well.

Furthermore, the concepts and technologies disclosed herein are not limited to media playback nodes 102 such as cell phones, tablets, laptops, other mobile devices, and IP televisions. Other mobile and fixed devices are contemplated, including, but not limited to, wearable devices. For example, collaborative lighting and audio effects can be produced by interactivity between users' clothing, wherein the fabric could be light and/or sound emitting, or the clothes could have light and/or sound emitting components. Additional opportunities include choreographed massive visual and audio effects using such clothing during concerts and other shows.

In a sixth illustrative user experience, the users 104 can be provided a special offer or other advertisement. If the users 104 participate in an advertising campaign, the users 104 may receive a discount on products purchased from stores, vending machines, and other venues. For example, if the users 104 walk near a vending machine, the media playback nodes 102 can emit light to create a dynamic colored streaming banner that appears to flow out of vending machine and ripple through a crowd. In another implementation, as the users 104 walk past the vending machine, the users 104 collectively hear the latest advertising jingle being provided synchronously by their respective media playback nodes 102. In another implementation, as the users 104 walk past items on sale in a store, the media playback nodes 102 collectively provide attention getting lighting and/or audio information. In another implementation, a multimedia advertising experience can be provided via the media playback nodes 102 operating on a moving vehicle (e.g., a bus or train) depending on the location of the vehicle, or proximity to a vending machine, store, or something else of interest.

Figure 2:
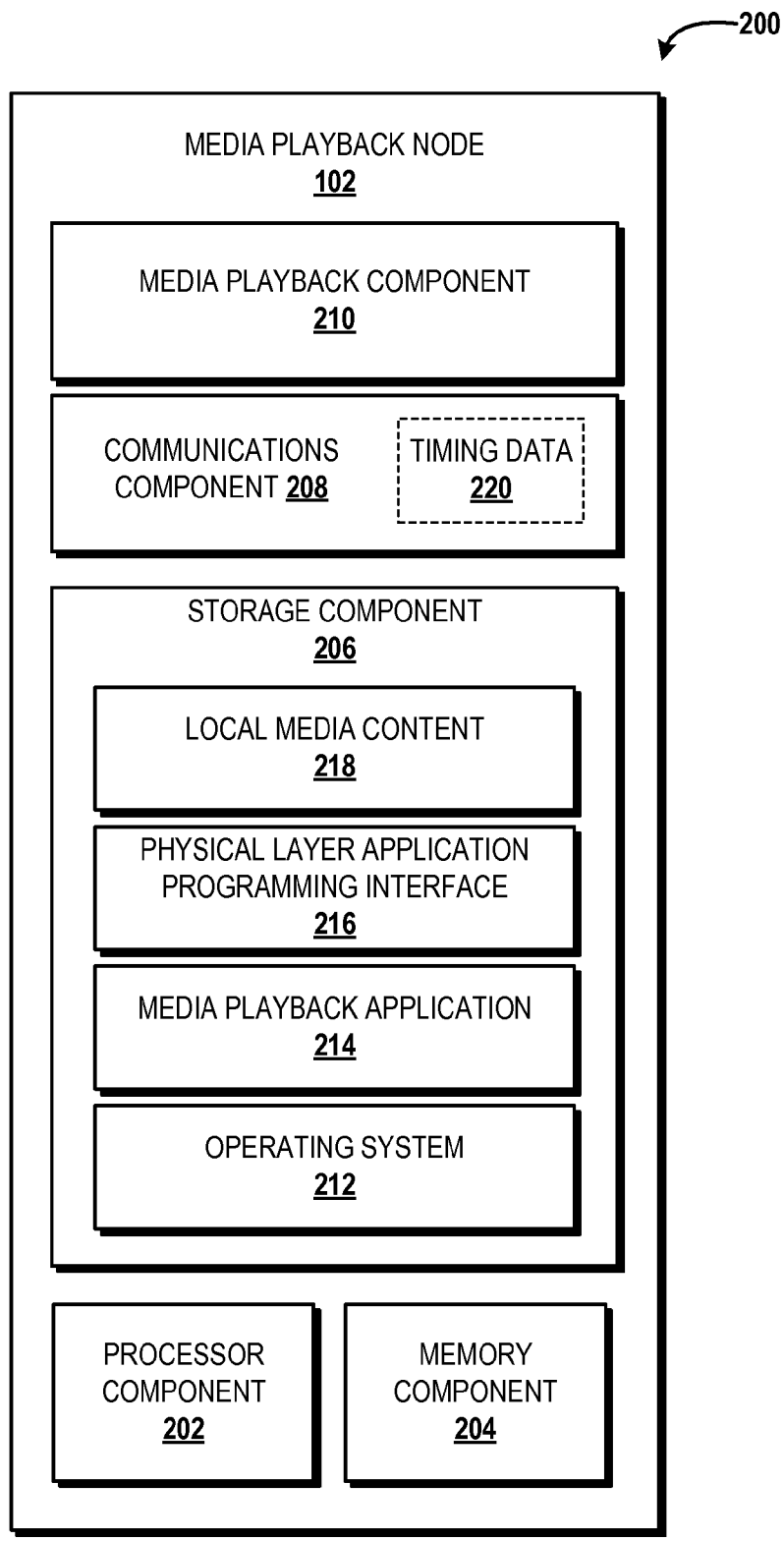
FIG. 2 is a diagram illustrating aspects of a media playback node, according to another illustrative embodiment

Turning now to FIG. 2, a diagram 200 illustrating aspects of the media playback node 102 will be described, according to another illustrative embodiment. The media playback node 102 is described as a mobile communications device such as a smartphone. Those skilled in the art, however, will understand the applicability of the components of the illustrated media playback node 102 to other devices, including, but not limited to, tablets, computers, handheld video game systems, personal media players, and the like. As such, the media playback node 102 and the illustrated components thereof should not be construed as being limiting in any way. The illustrated media playback node 102 includes a processor component 202, a memory component 204, a storage component 206, a communications component 208, and a media playback component 210.

The processor component 202 can include a central processing unit ("CPU") configured to process data, execute computer-executable instructions of one or more application programs and/or other software described herein, such as an operating system 212, a media playback application 214, and a physical layer application programming interface ("API") 216 stored in the storage component 206. The processor component 202 can communicate with other components of the media playback node 102 in order to perform various functionality described herein.

In some embodiments, the processor component 202 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, lighting effects, and the like. In some embodiments, the processor component 202 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some embodiments, the processor component 202 is or is included in a system-on-chip ("SoC") along with one or more of the other components described below. For example, the SoC can include the processor component 202, a GPU, the memory component 204, the storage component 206, the communications component 208, the media playback component 210, combinations thereof, and/or other components that are not shown. In some embodiments, the processor component 202 is fabricated, at least in part, utilizing a package-on-package ("PoP") integrated circuit packaging technique. The processor component 202 can be a single core or multi-core processor.

The processor component 202 can be created in accordance with an ARM architecture, available for license from ARM HOLDINGS of Cambridge, United Kingdom. Alternatively, the processor component 202 may be created in accordance with an x86 architecture, such as is available from INTEL CORPORATION of Mountain View, Calif. and others. In some embodiments, the processor component 202 is a SNAPDRAGON SoC, available from QUALCOMM of San Diego, Calif.; a TEGRA SoC, available from NVIDIA of Santa Clara, Calif.; a HUMMINGBIRD SoC, available from SAMSUNG of Seoul, South Korea; an Open Multimedia Application Platform ("OMAP") SoC, available from TEXAS INSTRUMENTS of Dallas, Tex.; a customized version of any of the above SoCs; or a proprietary SoC.

The memory component 204 can be or can include random access memory ("RAM"), read-only memory ("ROM"), a combination thereof, and/or the like. In some embodiments, the memory component 204 is integrated with the processor component 202. In some embodiments, the memory component 204 is configured to store a firmware, the operating system 212 or a portion thereof (e.g., operating system kernel), and/or a bootloader to load an operating system kernel from the storage component 206.

The storage component 206 can be or can include an integrated storage component. The integrated storage component can include a solid-state memory, a hard disk, or a combination of solid-state memory and a hard disk. The storage component 206 embodied as an integrated storage component may be soldered or otherwise connected to a logic board upon which the processor component 202 and/or other components described herein also may be soldered or otherwise connected. As such, the storage component 206 can be integrated in the media playback node 102. The storage component 206 can be configured to store the operating system 212 or portions thereof, the media playback application 214 or portions thereof, the physical layer API 216 or portions thereof, local media content 218 or portions thereof, application programs, data, and/or other software components described herein.

The storage component 206 can be or can include an external storage component. The external storage component can include a solid-state memory, a hard disk, or a combination of solid-state memory and a hard disk. In some embodiments, removable storage is provided in lieu of integrated storage such as described above. In other embodiments, removable storage is provided as additional optional storage. In some embodiments, removable storage is logically combined with integrated storage such that the total available storage is made available as a total combined storage capacity.

The storage component 206 embodied as external storage can be removable and can be inserted into a memory slot (not shown) or other mechanism by which the storage component 206 is inserted and secured to facilitate a connection over which the storage component 206 can communicate with other components of the media playback node, such as the processor component 202. Removable storage may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like. Removable storage can be configured to store the operating system 212 or portions thereof, the media playback application 214 or portions thereof, the physical layer API 216 or portions thereof, local media content 218 or portions thereof, application programs, data, and/or other software components described herein.

The communications component 208 can be or can include a WWAN component, a WLAN component, and/or a WPAN component. The communications component 208 can facilitate communications to and from the access network 112, the network 110, and/or the media playback network 106. The communications component 208 may facilitate simultaneous communication with multiple networks. For example, the communications component 208 may facilitate simultaneous communications with multiple networks via one or more of a WWAN, a WLAN, or a WPAN.

In some embodiments, communications component 208 is configured to provide dual-mode or multi-mode connectivity to the access network 112 and/or one or more other networks. For example, communications component 208 can be configured to provide connectivity to the access network 112, wherein the access network 112 provides access to the content server 108 and media content stored with the media content storage 114 in addition to the time reference server 116 and the application server 118. Alternatively, multiple communications component 208 can be utilized to perform such functionality, and/or provide additional functionality to support other non-compatible technologies (i.e., incapable of being supported by a single WWAN component). The communications component 208 can facilitate similar connectivity to multiple networks (e.g., a UMTS network and an LTE network).

The media playback component 210 can provide audio output capabilities for the media playback node 102. In some embodiments, the media playback component 210 includes a headphone jack configured to provide connectivity for headphones or other external speakers. In some embodiments, the media playback component 210 includes a speaker for the output of audio signals. In some embodiments, the media playback component 210 includes an optical audio cable out or other interface for connecting an external speaker via a wireless or wired connection.

The media playback component 210 can additionally or alternatively provide video output capabilities for the media playback node 102. In some embodiments, the media playback component 210 includes a video connector configured to receive video as input from another device (e.g., a video media player such as a DVD or BLURAY player) and output the video to another device (e.g., another media playback node). In some embodiments, media playback component 210 includes a High-Definition Multimedia Interface ("HDMI"), mini-HDMI, micro-HDMI, DisplayPort, or proprietary connector to output video content.

The media playback component 210 can include a display screen configured to present information in a visual form. In particular, the media playback component 210 can present graphical user interface ("GUI") elements, text, images, video, notifications, lighting effects, virtual buttons, virtual keyboards, messaging data, Internet content, device status, time, date, calendar data, preferences, map information, location information, and any other information that is capable of being presented in a visual form. In some embodiments, the media playback component 210 is a liquid crystal display ("LCD") utilizing any active or passive matrix technology and any backlighting technology (if used). In some embodiments, media playback component 210 is an organic light emitting diode ("OLED") display. Other display types are contemplated.

The media playback component 210 can include a light source. In some embodiments, the light source is a fluorescent bulb or LED, although other light source types are contemplated. The light source can be a single light source or an array of light sources and may be tied to other functions of the media playback node 102, such as a camera flash for a camera (not shown). The media playback component 210 can additionally include a software program that causes the light source to operate in a certain manner, such as creating a lighting effect.

The operating system 212 can be, but is not limited to, SYMBIAN OS from SYMBIAN LIMITED; WINDOWS mobile OS from MICROSOFT CORPORATION of Redmond, Wash.; WINDOWS phone OS from MICROSOFT CORPORATION; WINDOWS from MICROSOFT CORPORATION; PALM WEBOS from HEWLETT-PACKARD COMPANY of Palo Alto, Calif.; BLACKBERRY OS from RESEARCH IN MOTION LIMITED of Waterloo, Ontario, Canada; IOS from APPLE INC. of Cupertino, Calif.; and ANDROID OS from GOOGLE INC. of Mountain View, Calif. Other operating systems are contemplated.

The media playback application 214 can be or can include any software application configured to play the media content types described herein. The media playback application 214 can be configured to operate with a service, such as, for example, SPOTIFY streaming music service, available from SPOTIFY LTD., PANDORA streaming music service, available from PANDORA MEDIA, Inc., ITUNES RADIO streaming music service, available from APPLE INC., or NETFLIX streaming video service, available from NETFLIX, INC. In some other embodiments, the media playback application 214 can be configured to communicate with the content server 108 to download and/or upload media content.

The physical layer API 216 can provide access to physical layer information associated with signals exchanged between the media playback node 102 and networks, such as the access network 112. The physical layer information can include, but is not limited to, physical layer synchronization signal broadcast information received from one or more base stations, timing data 220 associated with the timing of signals sent by one or more base stations operating within the access network 112, and system frame number information broadcast by one or more base stations, as will be described in greater detail below with reference to FIGS. 3, 4A, and 4B. In some embodiments, the media playback application 214 utilizes the physical layer API 216 to access the physical layer information to be used in the performance of a synchronization method, such as the synchronization method described herein below with reference to FIGS. 4A and 4B.

The local media content 218 can include any media content described herein that is stored locally on the media playback node 102. The local media content 218 can be streamed from the media playback node 102 by the other media playback nodes 102 via the media playback network 106 created by the communications component 208. The local media content 218 can be downloaded by the media playback node 102 from the content server 108 and stored in the storage component 206. Alternatively, the local media content 218 can be downloaded from another source (e.g., a website) or acquired from another source such as physical media (e.g., a compact disc).

Figure 3:
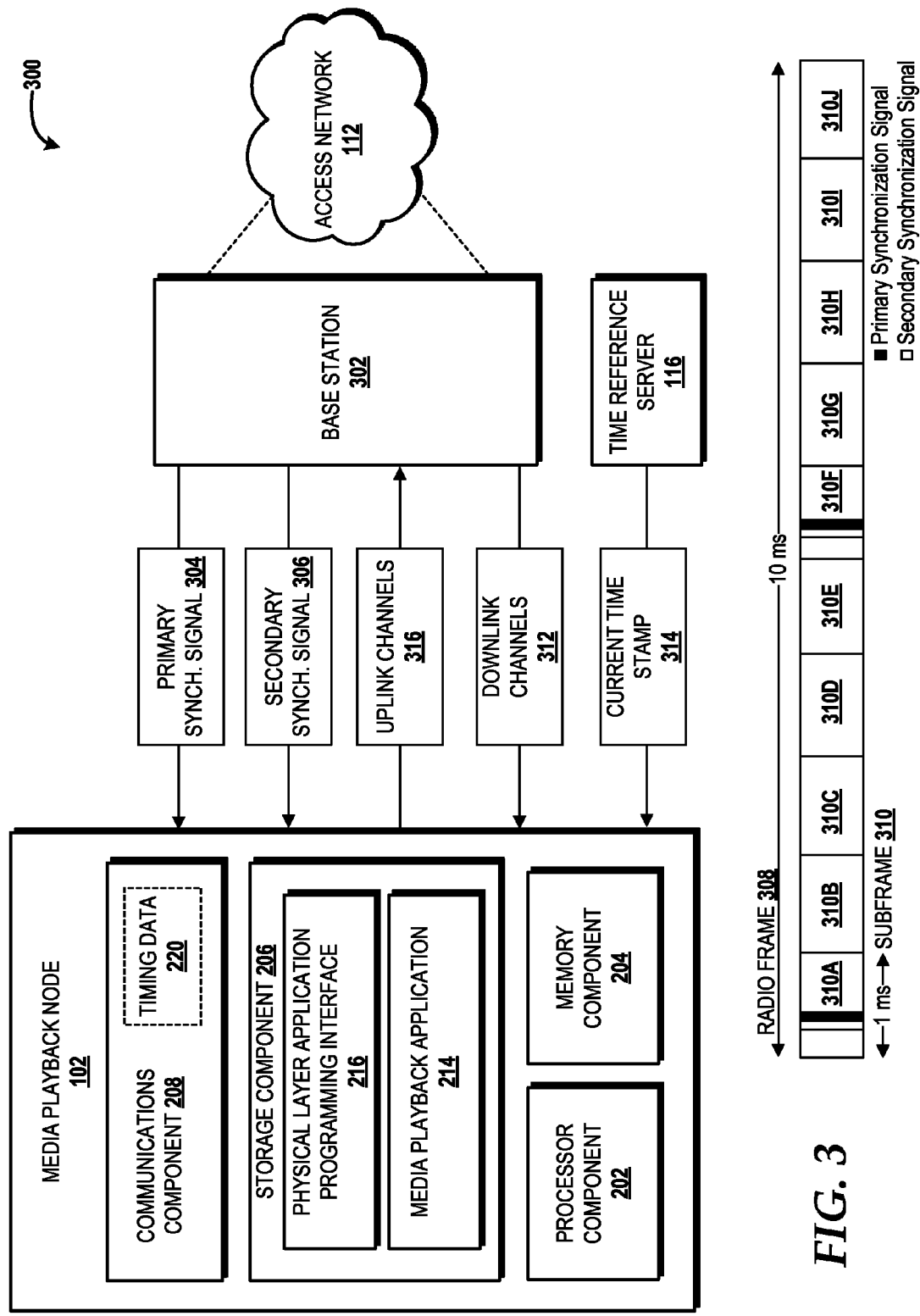
FIG. 3 is a diagram illustrating an operating environment for synchronizing media playback among a plurality of media playback nodes, according to an illustrative embodiment.

Turning now to FIG. 3, a diagram illustrating an operating environment 300 for synchronizing media playback among a plurality of media playback nodes will be described, according to an illustrative embodiment. The operating environment 300 includes the media playback node 102 with the processor component 202, the memory component 204, the storage component 206 in which the media playback application 214 and the physical layer API 216 are stored, and the communications component 208 described above with reference to FIG. 2. In addition, the operating environment 300 includes the access network 112 and the time reference server 116. The access network 112 includes a base station 302.

The base station 302 can be or can include one or more base transceiver stations ("BTSs"), Node-B's, eNode-B's, WI-FI access points, the like, or some combination thereof. For purposes of explaining the illustrated embodiment, the base station 302 will be described as an LTE base station, which is also known as an eNode-B. The base station 302 can transmit to the media playback node 102 two types of synchronization signals—a primary synchronization signal ("PSS") 304 and a secondary synchronization signal ("SSS") 306. The base station 302 may send the PSS 304 and the SSS 306 to the media playback node 102 twice per radio frame 308. The radio frame 308 is 10 milliseconds ("ms") in the illustrated example, although radio frames of greater or lesser time may be utilized depending upon the protocol used by the base station 302.

The PSS 304 and the SSS 306 help the media playback node 102 to be aligned in time with the base station 302. However, the use of the PSS 304 and the SSS 306 does not necessarily ensure that all the media playback nodes 102 will be synchronized in time with the other media playback nodes 102 (best shown in FIG. 1) during a media playback session because each of the media playback nodes 102 may be at a different distance from the base station 302. As a result, signals received from the base station 302 or sent by each of the media playback nodes 102 to the base station 302 may experience a different propagation delay over the wireless interface.

To ensure that all active media playback nodes 102 being served by the base station 302 are time synchronized with each other, the base station 302 can provide a time advance ("TA") correction to each of the media playback nodes 102 via the PSS 304. The base station 302 derives the TA correction for each of the media playback nodes 102 based upon differences in propagation delay associated with each of the media playback nodes 102. An initial TA correction and subsequent TA updates ensure that the transmissions of all of the media playback nodes 102 are synchronized with each other with an accuracy of approximately 0.52 microseconds ("μs") for an LTE implementation.

The concepts and technologies described herein can leverage this tight alignment between the media playback nodes 102 to ensure that all of the media playback nodes 102 play media content in a time synchronous manner. The physical layer API 216 is used to enable functionality within the media playback nodes 102 that allows certain physical layer timing data 220 to be made available to the application layer and subsequently utilized by applications, such as the media playback application 214, to synchronize playback of media content with other media playback nodes 102. Currently, mobile device chip vendors do not provide APIs for higher protocol layers to access this physical layer data information.

The remaining portion of the description of FIG. 3 describes how the physical layer timing data 220 can be used to provide time synchronization of media playback between the media playback nodes 102 that are connected to the access network 112 via the base station 302. In addition, conditions under which this tight synchronization method will break down will be described as well as potential solutions.

As briefly introduced above, the base station 302 can transmit the PSS 304 and the SSS 306 to help the media playback node 102 to identify the radio frame and time slot boundaries of the signals transmitted by the base station 302. In this manner, the media playback node 102 can properly receive information transmitted by the base station 302. However, the use of the PSS 304 and the SSS 306 does not necessarily allow each of the media playback nodes 102 to become time synchronous with other media playback nodes 102 being served by the base station 302. This is because each of the media playback nodes 102 may be at a different distance away from the base station 302 so the propagation delay (referred to herein as "$T_p$") experienced by the wireless signal to each media playback node 102 may be different. For example, if the base station 302 broadcasts a signal at time "$T_t$" to the entire cell served by the base station 302, media playback nodes 1 to n operating in that cell will receive a version of the signal as defined by Equation 1 below.

$T_r(i)=T_t+T_p(i)$, where $i=1$ to $n$ (Equation 1)

The base station 302 also can time synchronize the signals being transmitted by the media playback nodes 102 on uplink channels 316 so that the signals do not collide with each other. In order to time synchronize the signals being transmitted by the media playback nodes 102, the base station 302 can provide the TA information to each of the media playback nodes 102, thereby allowing each of the media playback nodes 102 to estimate a propagation delay ($T_p$) over the wireless interface. The TA information has a very fine granularity of 0.52 micro-seconds in the example LTE implementation, so the TA information can allow very tight time synchronization. The TA information TA(i) for the media playback node i can be calculated by Equation 2 below, where i=1 to n, and $T_p(i)$ is the propagation delay for media playback node i.

$TA(i)=2*T_p(i)$ (Equation 2)

This means that if each of the media playback nodes 102 operating in the cell served by the base station 302 should start playing media at exactly a pre-determined time $T_{play}$ (e.g., 9.30 PM), then each media playback node i should begin playing at time $T_{start}$ when the base station 302 signal reception time $T_r(i)$=reference time $T_{ref}(i)$, as calculated by Equation 3 below.

$T_{start}(i)=T_{ref}(i)-TA(i)/2,$ (Equation 3)

A deterministic relation exists between $T_{ref}(i)$ and $T_{play}$. A problem here is that there is no real time reference from the base station 302 from which one can derive a deterministic relation between $T_{ref}$ and $T_{play}$. To solve this reference problem, a subframe number ("SFN") that identifies a subframe 310A-310J of the radio frame 308 and is broadcast by the base station 302 in a master information block ("MIB") of a physical broadcast channel ("PBCH"), is included in downlink channels 312 in the illustrated example. The SFN increments every 10 ms (i.e., every subframe 310), and ranges in value from 0 to 1023. The SFN values range a time span of 10.24 seconds, and therefore if each of the media playback nodes 102 was asked to begin media playback at a time at which SFN=0 (or any chosen value between 0 and 1023), then that time can be used as a time reference $T_{ref}$.

Another problem exists because each of the media playback nodes 102 should be told at which occurrence of SFN=0 or otherwise to use as $T_{ref}$. To solve this problem, each of the media playback nodes 102 can periodically set a time reference clock according to a common time reference received from the time reference server 116. When each of the media playback nodes 102 requests the common time reference from the time reference server 116, the time reference server 116 can send a packet containing a current time stamp $T_{stamp}$ 314. Each of the media playback nodes 102 that requests the current time stamp 314 may receive the packet at a different time due to possible differences in the network path traversed by the packets (and other factors such as network congestion, etc.). However, the maximum difference in network traverse time between the packets received by each of the media playback nodes 102 in the cell served by the base station 302 is extremely unlikely to be greater than 10.24 seconds—that is, the time span of the SFN values. The unlikelihood of the maximum difference in network traverse time between the packets received by each of the media playback nodes 102 in the cell served by the base station 302 being greater than 10.25 can be utilized to derive an absolute time reference $T_{ref}$ for determination of media playback time according to Equation 4 below.

$T_{ref}$=First occurrence of SFN=N after $T_{stamp}=T_{play}$ (Equation 4)

The combination of Equations 3 and 4 can be used to ensure that within a maximum time window of 0 to 10.24 seconds after an absolute time $T_{play}$, the media playback nodes 102 in the cell served by the base station 302 will start playing media at exactly the same time within a synchronization accuracy of 0.52 micro-seconds.

In order to implement some of the LTE-Advanced features, more and more operators may synchronize all base stations to a common reference. This means that the above synchronization method will become feasible for pools of devices being served by different base stations within an operator's network.

Figure 4A:
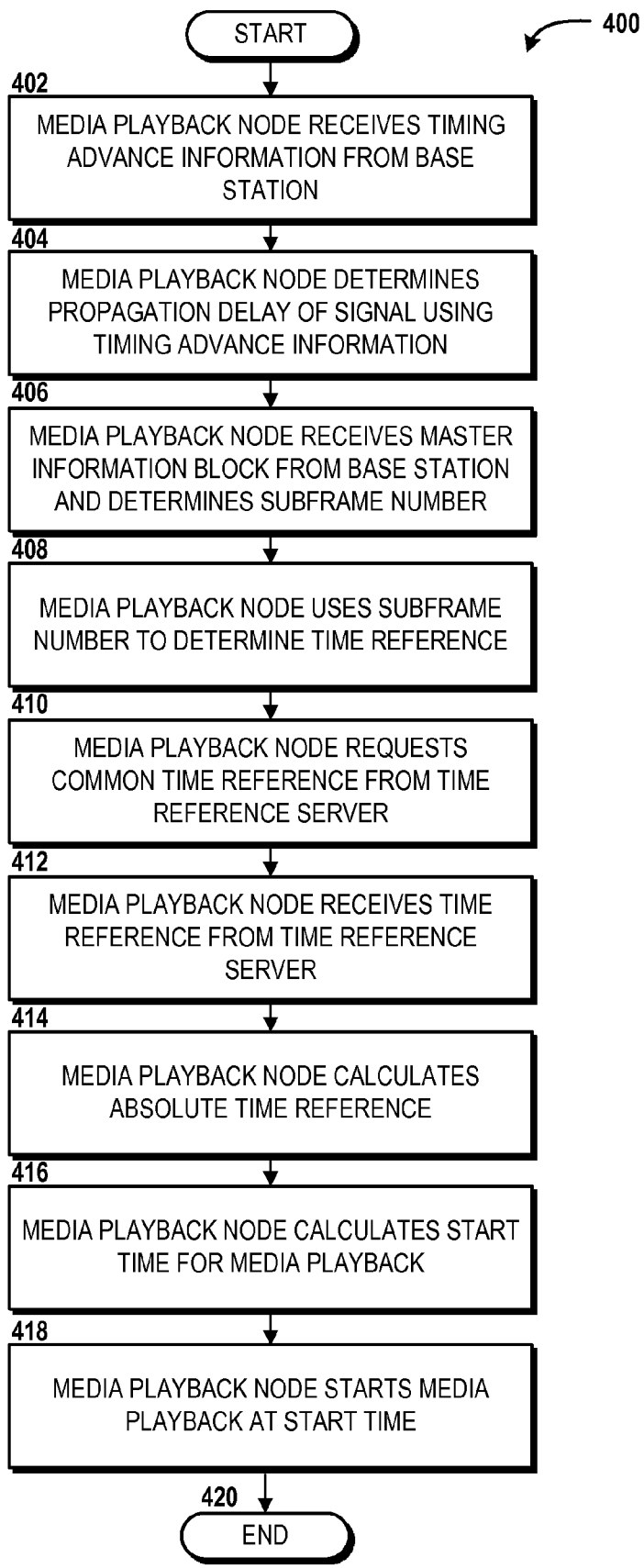
FIG. 4A is a flow diagram illustrating aspects of a method for synchronizing media playback among a plurality of media playback nodes, according to an illustrative embodiment.

Turning now to FIG. 4A, a flow diagram illustrating aspects of a method 400 for synchronizing media playback among a plurality of media playback nodes such as the media playback nodes 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device to perform one or more operations and/or causing the processor to direct other components of the computing system or device to perform one or more of the operations.

For purposes of illustrating and describing the concepts of the present disclosure, operations of the methods disclosed herein are described as being performed by a computing system via execution of one or more software modules described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will now be described with reference to FIGS. 3 and 4. The method 400 begins at operation 402, where the media playback node 102 receives TA information in a signal from the base station 302. From operation 402, the method 400 proceeds to operation 404, where the media playback node 102 estimates the propagation delay of the signal using the TA information received at operation 402.

From operation 404, the method 400 proceeds to operation 406, where the media playback node 102 receives a MIB from the base station 302 and analyzes the MIB to determine the SFN included in the MIB. From operation 406, the method 400 proceeds to operation 408, where the media playback node 102 uses the SFN to determine a time reference.

From operation 408, the method 400 proceeds to operation 410, where the media playback node 102 requests a common time reference from the time reference server 116. From operation 410, the method 400 proceeds to operation 412, where the media playback node 102 receives the common time reference from the time reference server 116. From operation 412, the method 400 proceeds to operation 414, where the media playback node 102 calculates an absolute time reference.

From operation 414, the method 400 proceeds to operation 416, where the media playback node 102 calculates a start time for media playback. From operation 416, the method 400 proceeds to operation 418, where the media playback node 102 starts media playback at the calculated start time.

From operation 418, the method 400 proceeds to operation 420. The method 400 ends at operation 420.

Figure 4B:
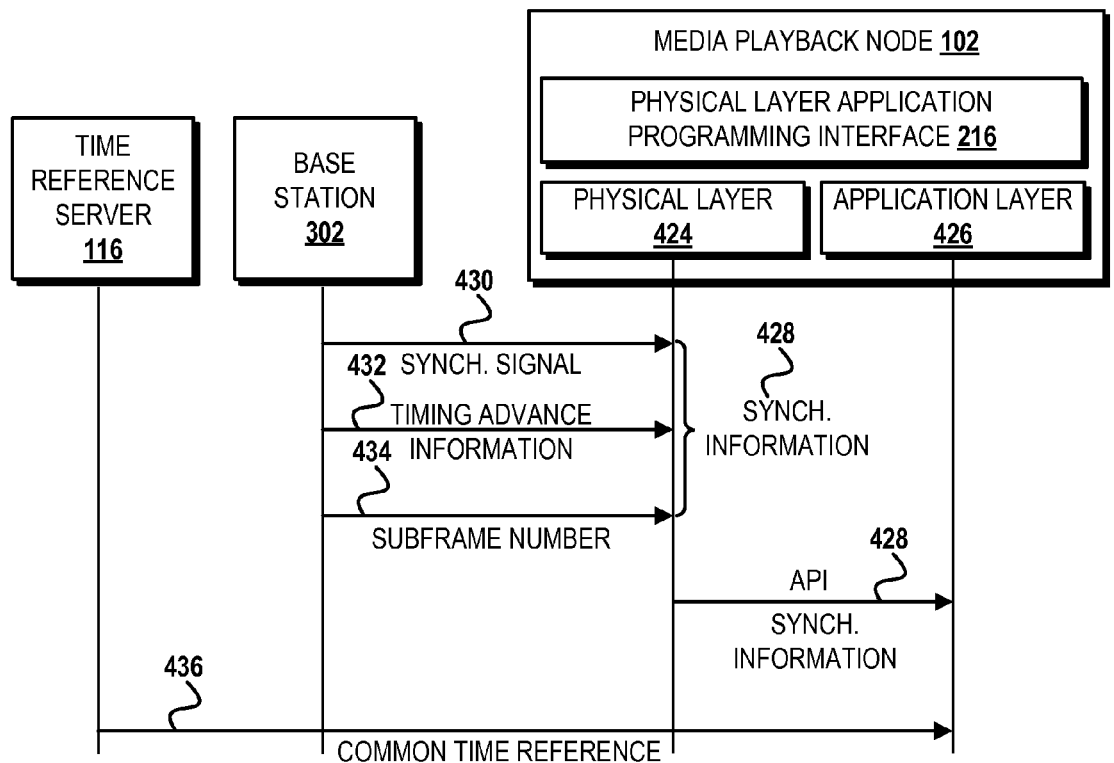
FIG. 4B is a diagram illustrating aspects of the method illustrated in FIG. 4A for synchronizing media playback among a plurality of media playback nodes, according to an illustrative embodiment

Turning now to FIG. 4B, a diagram 422 illustrating aspects of the method 400 for synchronizing media playback among a plurality of media playback nodes such as the media playback nodes 102 will be described, according to an illustrative embodiment. The illustrated diagram 422 includes the time reference server 116, the base station 302, and the media playback node 102. The media playback node 102 is shown having a physical layer 424 with which the physical layer API 216 can communicate to provide synchronization information to an application layer 426 for use by the application layer 426 in facilitating collaborative media playback in accordance with embodiments disclosed herein.

In the illustrated embodiment, the base station 302 provides synchronization information 428 to the media playback node 102. The synchronization information 428 can include a synchronization signal 430, timing advance information 432, and a subframe number 434. The physical layer 424 of the media playback node 102 receives the synchronization information 428 from the base station 302. In response to an API call received by the physical layer API 216 from one or more applications operating within the application layer 426, the physical layer 424 can provide the synchronization information 428 to the application layer 426. The time reference server 116 can provide a common time reference 436, such as the current time stamp 314, to the application(s) operating within the application layer 426. The media playback node 102 can utilize the synchronization information 428 and the common time reference 436 to calculate the start time for media playback in accordance with the method 400 described above.

Figure 5:
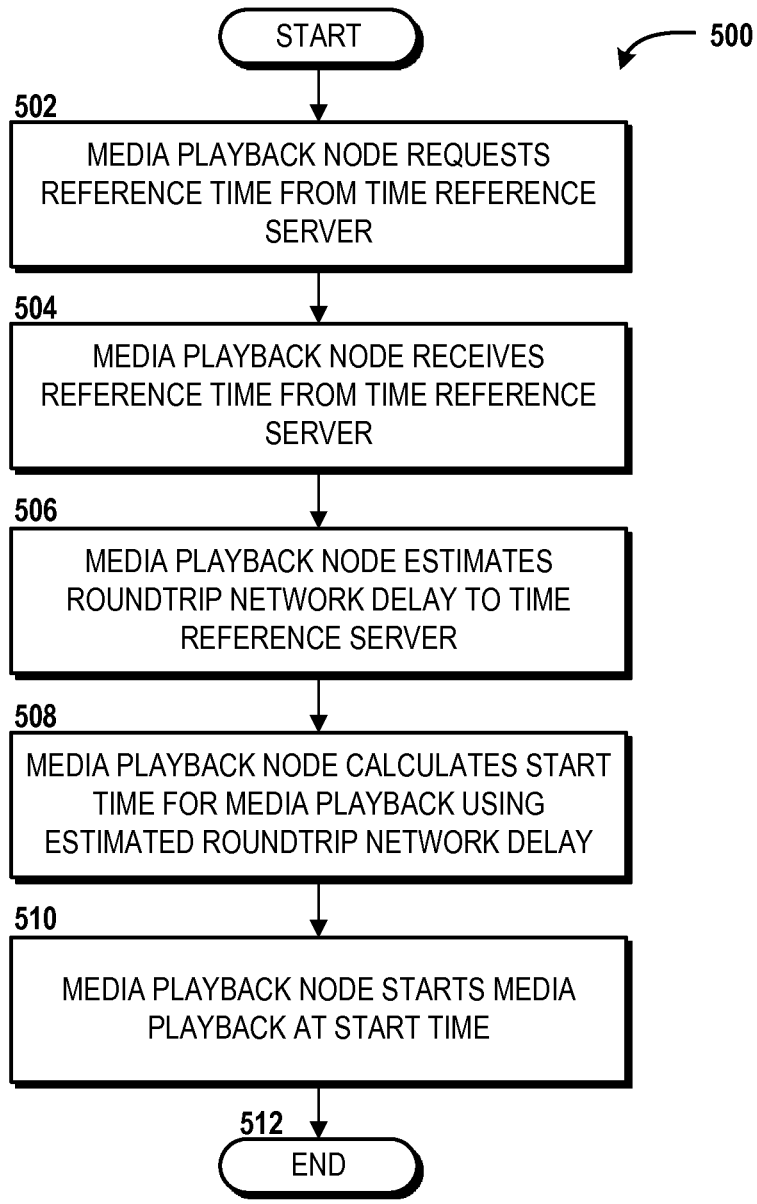
FIG. 5 is a flow diagram illustrating aspects of another method for synchronizing media playback among a plurality of media playback nodes, according to an illustrative embodiment.

Turning now to FIG. 5, a flow diagram illustrating aspects of a method 500 for synchronizing media playback among a plurality of media playback nodes such as the media playback nodes 102 will be described, according to an illustrative embodiment. The method 500 begins and proceeds to operation 502, where the media playback node 102 requests a reference time from the time reference server 116. From operation 502, the method 500 proceeds to operation 504, where the media playback node 102 receives the reference time from the time reference server 116. From operation 504, the method 500 proceeds to operation 506, wherein the media playback node 102 estimates a roundtrip network delay to the time reference server 116.

From operation 506, the method 500 proceeds to operation 508, where the media playback node 102 calculates a start time for media playback using the estimated roundtrip network delay. From operation 508, the method 500 proceeds to operation 510, where the media playback node starts media playback at the calculated start time.

From operation 510, the method proceeds to operation 512. The method 500 ends at operation 512.

Figure 6:
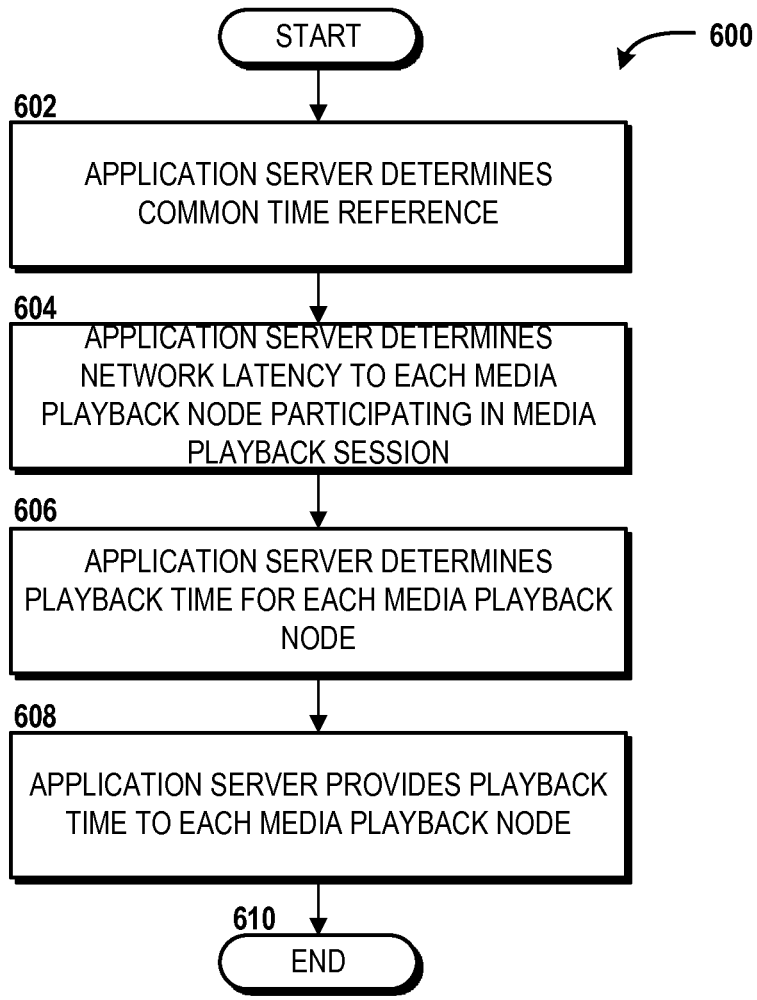
FIG. 6 is a flow diagram illustrating aspects of another method for synchronizing media playback among a plurality of media playback nodes, according to an illustrative embodiment.

Turning now to FIG. 6, a flow diagram illustrating aspects of a method 600 for synchronizing media playback among a plurality of media playback nodes such as the media playback nodes 102 will be described, according to an illustrative embodiment. The method 600 begins and proceeds to operation 602, where the application server 118 determines a common time reference. From operation 602, the method 600 proceeds to operation 604, where the application server 118 determines a network latency to each media playback node 102 participating in media playback session. From operation 604, the method 600 proceeds to operation 606, where the application server 118 determines a playback time for each media playback node 102 based upon the network latency determined for each media playback node 102. From operation 606, the method 600 proceeds to operation 608, where the application server 118 provides the playback time to each media playback node 102 participating in the media session.

From operation 608, the method 600 proceeds to operation 610. The method 600 ends at operation 610.

Figure 7:
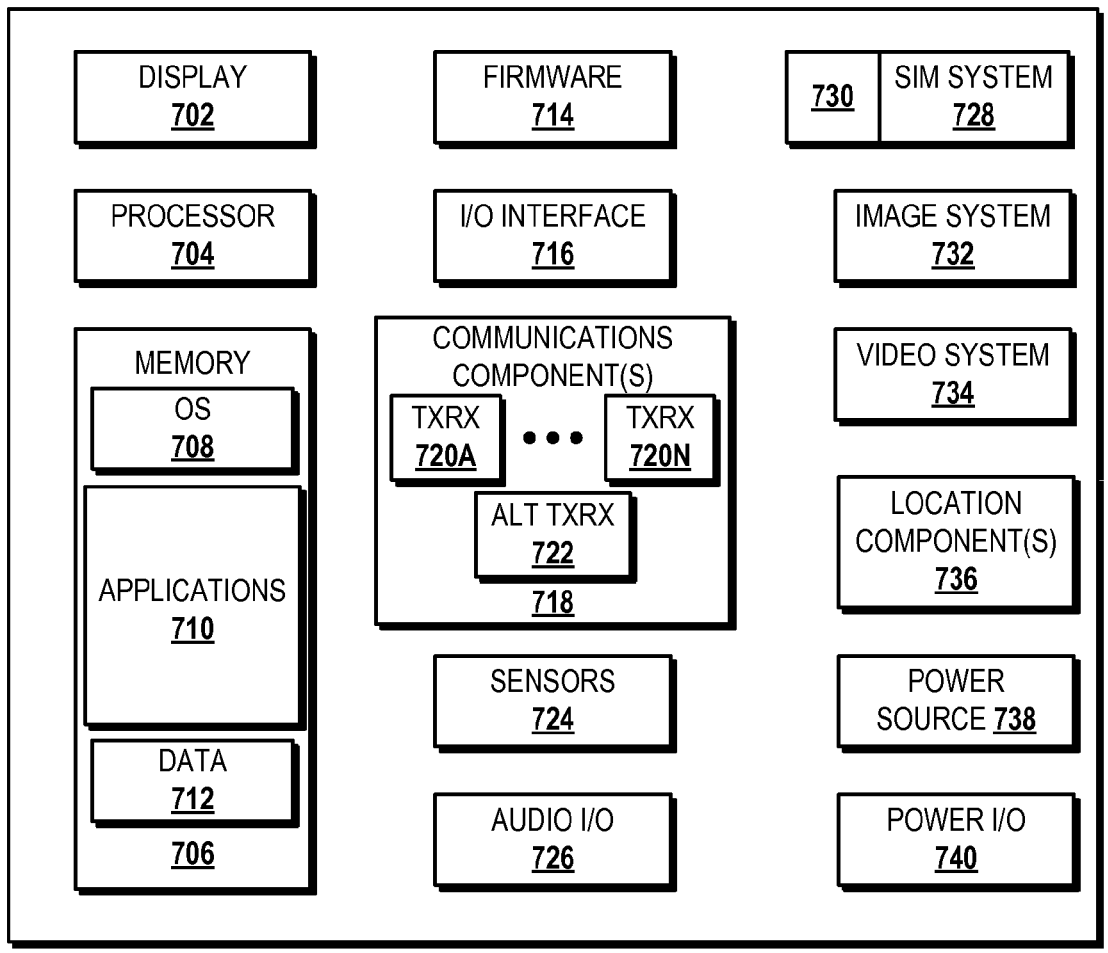
FIG. 7 is a block diagram illustrating an example mobile device, according to some illustrative embodiments.

Turning now to FIG. 7, an illustrative mobile device 700 and components thereof will be described. In some embodiments, the media playback nodes 102 described above can be configured as and/or can have an architecture similar or identical to the mobile device 700 described herein with respect to FIG. 7. It should be understood, however, that the media playback nodes 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various visual effects, graphical user interface ("GUI") elements, text, images, video, virtual keypads and/or keyboards, messaging data, notification messages, metadata, internet content, device status, time, date, calendar data, device preferences, map and location data, customer service interactions, combinations thereof, and the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708 such as the operating system 212, one or more applications 710 such as the media playback application 214, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in answering/initiating calls, entering/deleting other data, entering and setting user IDs and passwords for device access, configuring settings, manipulating address book content and/or settings, multimode interaction, interacting with other applications, and otherwise facilitating user interaction with the operating system 708, the applications 710, and/or other types or instances of data 712 that can be stored at the mobile device 700.

According to various embodiments, the applications 710 can include, for example, the media playback application 214, the physical layer API 216, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It should be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet ("RJ47") port, an RJ7 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks, such as the network 110. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, or more than two transceivers 720 can be included in the communications component 718.

The communications component 718 also can include an alternative transceiver ("Alt TxRx") 722 (e.g., the NFC component 708) for supporting other types and/or standards of communications. According to various contemplated embodiments, the alternative transceiver 722 can communicate using various communications technologies such as, for example, WI-FI, WIMAX, BLUETOOTH, BLE, infrared, infrared data association ("IRDA"), NFC, other RF technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include accelerometers, magnetometers, gyroscopes, infrared sensors, noise sensors, microphones, temperature sensors, light sensors, air quality sensors, movement sensors, orientation sensors, noise sensors, proximity sensors, any of the other sensors described herein, combinations thereof, and the like. One or more of the sensors 724 can be used to detect movement of the mobile device 700. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a location of the mobile device 700. According to various embodiments, the location components 736 can send and/or receive signals from GPS devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 can include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
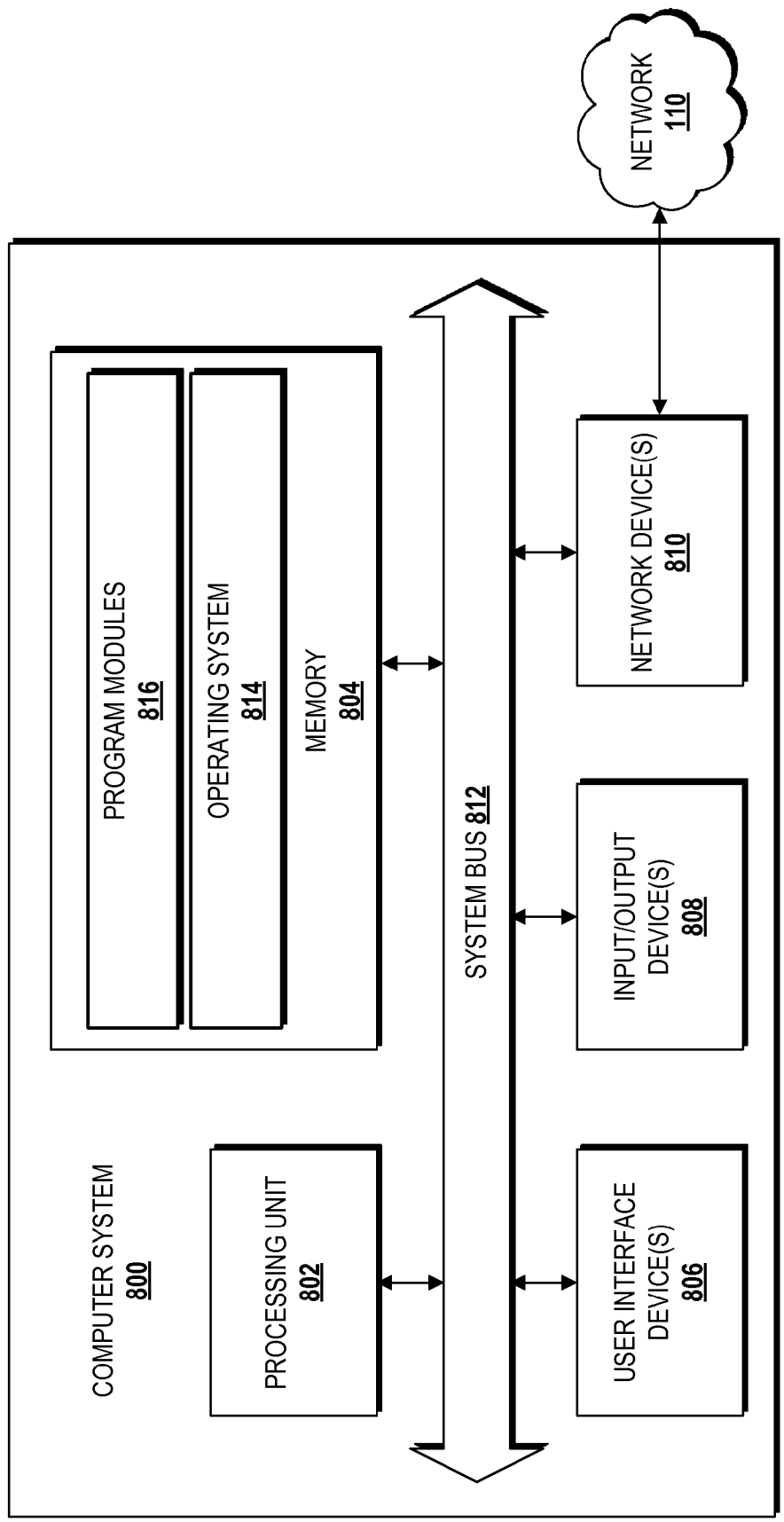
FIG. 8 is a block diagram illustrating an example computer system, according to some illustrative embodiments.

FIG. 8 is a block diagram illustrating a computer system 800 configured to provide the functionality described herein in accordance with various embodiments of the concepts and technologies disclosed herein. In some embodiments, the content server 108, the time reference server 116, and/or the application server 118 utilize hardware architecture similar or identical to the computer system 800 described herein with respect to FIG. 8. It should be understood, however, that the content server 108, the time reference server 116, and/or the application server 118 may or may not utilize hardware that includes the functionality described herein with reference to FIG. 8.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816 that can be executed by the processing unit 802 described herein. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 816 can include various software and/or program modules described herein. The program modules 816 can be embodied in computer-readable media containing instructions that, when executed by the processing unit 802, perform at least a portion of one or more of the methods described above. According to embodiments, the program modules 816 may be embodied in hardware, software, firmware, or any combination thereof.

By way of example, and not limitation, computer-readable media can include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 can include one or more devices with which a user accesses the computer system 800. The user interface devices 806 can include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 can include one or more input devices, such as, but not limited to, a keyboard, a mouse, or an electronic stylus. Further, the I/O devices 808 can include one or more output devices, such as, but not limited to, a display screen or a printer to output data in the form of text, numbers, characters, maps, other visualizations, and the like.

The network devices 810 enable the computer system 800 to communicate with other networks or remote systems via one or more networks such as the network 110. Examples of the network devices 810 include, but are not limited to, a modem, a radio frequency ("RF") or infrared ("IR") transceiver, a telephonic interface, a bridge, a router, or a network card. Additional network can include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network 84 may be a wired network such as, but not limited to, a WAN such as the Internet, a LAN, a wired PAN, or a wired MAN.

Figure 9:
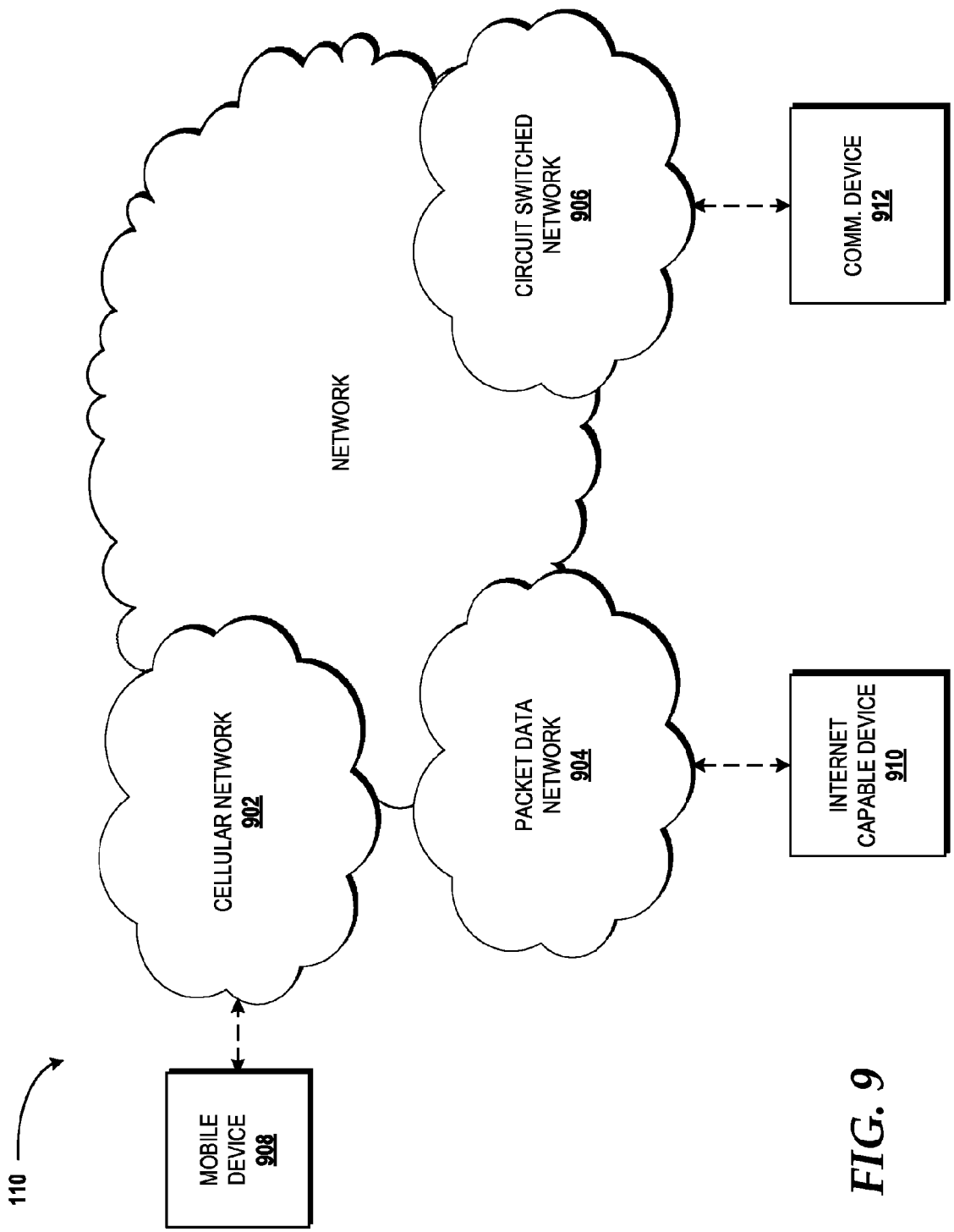
FIG. 9 schematically illustrates a network, according to an illustrative embodiment.

Turning now to FIG. 9, additional details of an embodiment of the network 110 are illustrated, according to an illustrative embodiment. The network 110 can include a cellular network 902, which can include the access network 112, a packet data network 904, for example, the Internet, and a circuit switched network 906, for example, a publicly switched telephone network ("PSTN"). The cellular network 902 includes various components such as, but not limited to, the base station 302, and/or other base transceiver stations ("BTSs"), Node-B's or eNode-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The media playback nodes 102 can be configured like the mobile communications device 908. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 can include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a personal computer ("PC"), a laptop, a portable device, or another suitable device, can communicate with one or more cellular networks 902, and devices connected thereto, through the packet data network 904. The media playback nodes 102 can be configured like the Internet-capable device 910. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 110 may be used to refer broadly to any combination of the networks 902, 904, 906. It should be appreciated that substantially all of the functionality described with reference to the network 110 can be performed by the cellular network 902, the packet data network 904, and/or the circuit switched network 906, alone or in combination with other networks, network elements, and the like.

Based on the foregoing, it should be appreciated that aspects of collaborative media playback have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A mobile communications device comprising:
a storage component storing a physical layer application programming interface;
a processor component; and
a memory component that stores a media playback application and instructions that, when executed by the processor component, cause the processor component to perform operations comprising
receiving, from a base station serving the mobile communications device, information for use in determining a start time for playback of media content by the mobile communications device so that playback of the media content by the mobile communications device is in sync with playback of the media content by a further mobile communications device served by the base station, wherein the information received from the base station is received by a physical layer of the mobile communications device, wherein the information received from the base station comprises a time advance correction corresponding to the mobile communications device and further comprises a subframe number that identifies a subframe of a radio frame broadcast by the base station, wherein the base station derives the time advance correction corresponding to the mobile communications device and a time advance correction corresponding to the further mobile communications device, wherein the time advance correction corresponding to the mobile communications device is based upon a propagation delay associated with the mobile communications device and the time advance correction corresponding to the further mobile communications device is based upon a different propagation delay associated with the further mobile communications device, calling, by the media playback application, the physical layer application programming interface to obtain the information received by the physical layer of the mobile communications device from the base station, receiving, at an application layer of the mobile communications device, from the physical layer of the mobile communications device, the information received by the physical layer of the mobile communications device from the base station, wherein the media playback application accesses the information from the application layer of the mobile communications device, determining, using the time advance correction corresponding to the mobile communications device, the propagation delay associated with the mobile communications device, requesting a common time reference from a time reference server, receiving, from the time reference server, the common time reference, setting a time reference clock of the mobile communications device in accordance with the common time reference, determining a time reference, wherein the time reference is determined based on a first occurrence of the subframe number equaling a chosen value after the time reference clock of the mobile communications device set in accordance with the common time reference equals a predetermined time when the mobile communications device and the further mobile communications device are to start playback of the media content, determining, based at least in part upon the propagation delay associated with the mobile communications device and the time reference, the start time for playback of the media content by the mobile communications device, and initiating playback of the media content at the start time.

2. The mobile communications device of claim 1, wherein the memory component stores the media content.

3. The mobile communications device of claim 1, wherein the media content comprises audio content and at least one of video content or lighting effects content.

4. The mobile communications device of claim 1, wherein initiating playback of the media content at the start time comprises initiating playback of a portion of the media content, wherein a further portion of the media content is played by the further mobile communications device.

5. The mobile communications device of claim 1, wherein the operations further comprise:
streaming the media content from a content server;
establishing a media playback network comprising the mobile communications device and the further mobile communications device; and
providing the media content to the further mobile communications device via the media playback network.

6. The mobile communications device of claim 1, wherein determining the start time for playback of the media content comprises determining the start time for playback of the media content to be within a maximum time window dictated by a time span of subframe number values.

7. The mobile communications device of claim 6, wherein the subframe number values range from 0 to 1023.

8. The mobile communications device of claim 7, wherein the subframe number increments every 10 milliseconds.

9. The mobile communications device of claim 1, wherein the subframe number is broadcast by the base station in a master information block of a physical broadcast channel.

10. A method comprising:
receiving, by a mobile communications device, from a base station serving the mobile communications device, information for use in determining a start time for playback of media content by the mobile communications device so that playback of the media content by the mobile communications device is in sync with playback of the media content by a further mobile communications device served by the base station, wherein the information received from the base station is received by a physical layer of the mobile communications device, wherein the information received from the base station comprises a time advance correction corresponding to the mobile communications device and further comprises a subframe number that identifies a subframe of a radio frame broadcast by the base station, wherein the base station derives the time advance correction corresponding to the mobile communications device and a time advance correction corresponding to the further mobile communications device, wherein the time advance correction corresponding to the mobile communications device is based upon a propagation delay associated with the mobile communications device and the time advance correction corresponding to the further mobile communications device is based upon a different propagation delay associated with the further mobile communications device;

calling, by a media playback application stored by a memory component of the mobile communications device, a physical layer application programming interface stored by a storage component of the mobile communications device to obtain the information received by the physical layer of the mobile communications device from the base station, receiving, at an application layer of the mobile communications device, from the physical layer of the mobile communications device, the information received by the physical layer of the mobile communications device from the base station, wherein the media playback application accesses the information from the application layer of the mobile communications device, determining, by the mobile communications device, using the time advance correction corresponding to the mobile communications device, the propagation delay associated with the mobile communications device, requesting, by the mobile communications device, a common time reference from a time reference server;

receiving, by the mobile communications device, from the time reference server, the common time reference;

setting, by the mobile communications device, a time reference clock of the mobile communications device in accordance with the common time reference;

determining, by the mobile communications device, a time reference, wherein the time reference is determined based on a first occurrence of the subframe number equaling a chosen value after the time reference clock of the mobile communications device set in accordance with the common time reference equals a predetermined time when the mobile communications device and the further mobile communications device are to start playback of the media content;

determining, by the mobile communications device, based at least in part upon the propagation delay associated with the mobile communications device and the time reference, the start time for playback of the media content by the mobile communications device; and initiating, by the mobile communications device, playback of the media content at the start time.

11. The method of claim 10, further comprising storing the media content in a memory component of the mobile communications device.

12. The method of claim 10, wherein determining the start time for playback of the media content comprises determining the start time for playback of the media content to be within a maximum time window dictated by a time span of subframe number values.

13. The method of claim 12, wherein the subframe number values range from 0 to 1023.

14. The method of claim 13, wherein the subframe number increments every 10 milliseconds.

15. A computer storage medium having computer-executable instructions stored thereon that, when executed by a processing component of a mobile communications device, cause the mobile communications device to perform operations comprising:

receiving, from a base station serving the mobile communications device, information for use in determining a start time for playback of media content by the mobile communications device so that playback of the media content by the mobile communications device is in sync with playback of the media content by a further mobile communications device, wherein the information received from the base station is received by a physical layer of the mobile communications device, wherein the information received from the base station comprises a time advance correction corresponding to the mobile communications device and further comprises a subframe number that identifies a subframe of a radio frame broadcast by the base station, wherein the base station derives the time advance correction corresponding to the mobile communications device and a time advance correction corresponding to the further mobile communications device, wherein the time advance correction corresponding to the mobile communications device is based upon a propagation delay associated with the mobile communications device and the time advance correction corresponding to the further mobile communications device is based upon a different propagation delay associated with the further mobile communications device;

calling, by a media playback application stored by a memory component of the mobile communications device, a physical layer application programming interface stored by a storage component of the mobile communications device to obtain the information received by the physical layer of the mobile communications device from the base station;

receiving, at an application layer of the mobile communications device, from the physical layer of the mobile communications device, the information received by the physical layer of the mobile communications device from the base station, wherein the media playback application accesses the information from the application layer of the mobile communications device;

determining, using the time advance correction corresponding to the mobile communications device, the propagation delay associated with the mobile communications device;

requesting a common time reference from a time reference server;

receiving, from the time reference server, the common time reference;

setting a time reference clock of the mobile communications device in accordance with the common time reference;

determining a time reference, wherein the time reference is determined based on a first occurrence of the subframe number equaling a chosen value after the time reference clock of the mobile communications device set in accordance with the common time reference equals a predetermined time when the mobile communications device and the further mobile communications device are to start playback of the media content;

determining, based at least in part upon the the propagation delay associated with the mobile communications device and the time reference, the start time for playback of the media content by the mobile communications device; and initiating playback of the media content at the start time.

16. The computer storage medium of claim 15, wherein determining the start time for playback of the media content comprises determining the start time for playback of the media content to be within a maximum time window dictated by a time span of subframe number values.

17. The computer storage medium of claim 16, wherein the subframe number values range from 0 to 1023 and wherein the subframe number increments every 10 milliseconds.

* * * * *